Jan. 19, 1937.　　　W. L. ORR　　　2,068,508
ANIMAL TRAP
Original Filed June 29, 1933
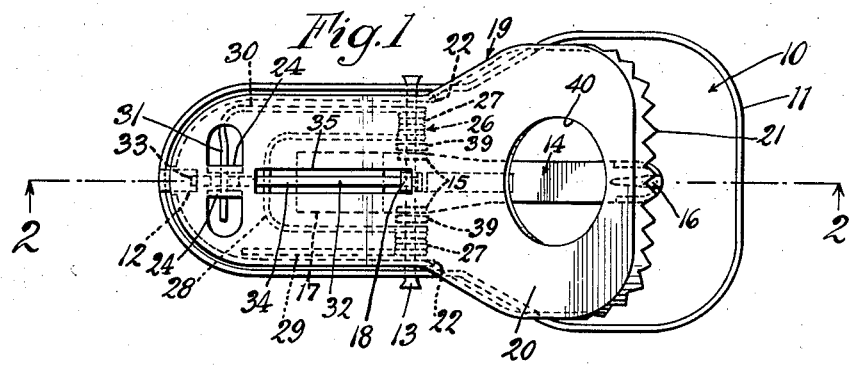
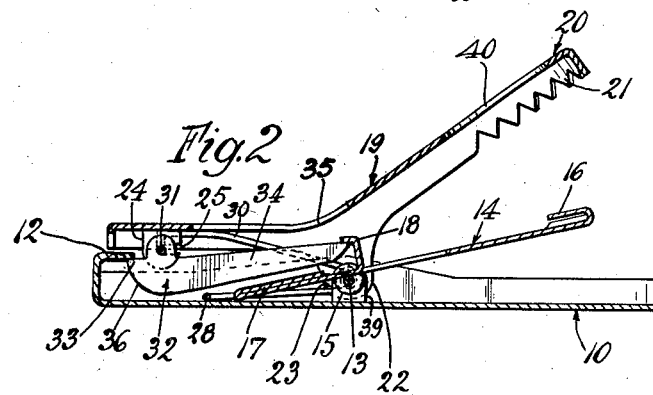
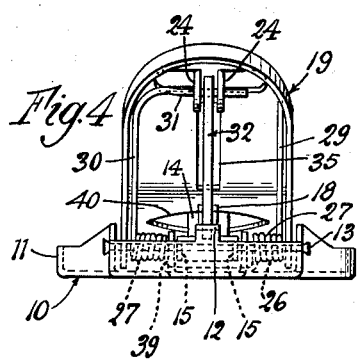
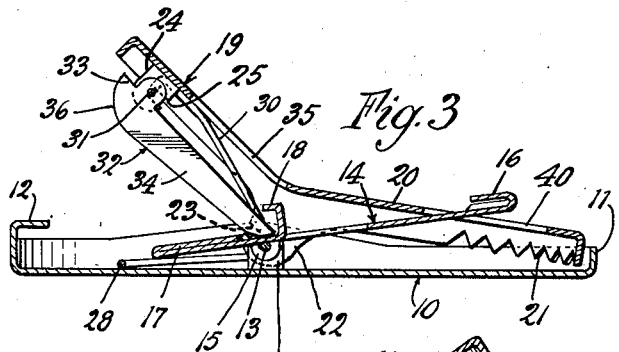
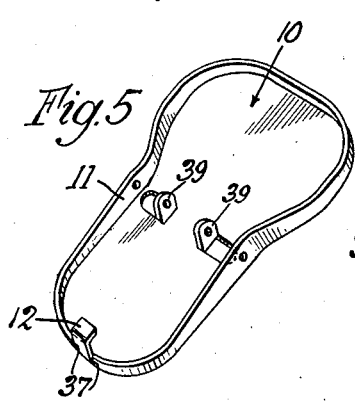
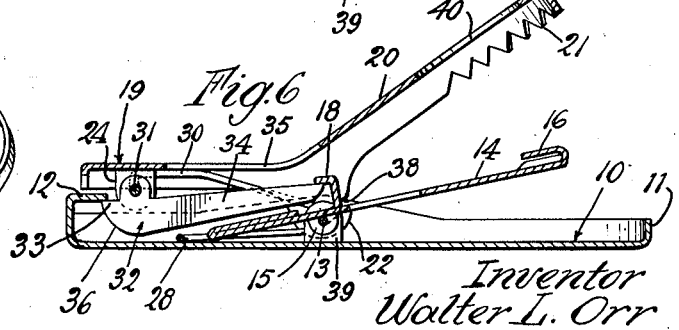
Inventor
Walter L. Orr
by Maxwell F. Cargill
Attorney.

Patented Jan. 19, 1937

2,068,508

UNITED STATES PATENT OFFICE 2,068,508

ANIMAL TRAP

Walter Leslie Orr, Los Angeles, Calif., assignor to Edgar C. Guthard, Chicago, Ill.

Application June 29, 1933, Serial No. 678,135
Renewed July 27, 1935

18 Claims. (Cl. 43—83)

This invention relates to improvements in animal traps.

One object of the invention is to provide a trap having a very sensitive trigger mechanism which, when the bait lever is actuated, will release the trigger and spring the trap.

A more specific object of the invention is to provide a trap having a spring actuated jaw which pivotally carries a trigger having a short catch-engaging arm at the rear side of the pivot and a relatively long arm at the forward side of the pivot, the long arm engaging a catch on a bait lever and due to the relatively slight pressure exerted by the long arm on said catch requiring but slight pressure on the lever to release the trigger and spring the trap.

Another object of the invention is to provide a trap most of the parts of which preferably are sheet metal stampings which can be readily assembled, the trap being particularly well adapted for production in large quantities and at relatively low cost.

Other objects relating to various features of construction and arrangement of parts will be apparent from a consideration of the following specification and accompanying drawing wherein:

Figure 1 is a top plan view of a trap shown in set position embodying the present improvements;

Figure 2 is a vertical sectional view taken on line 2—2 of Figure 1;

Figure 3 is a similar sectional view showing the trap in capturing position;

Figure 4 is a rear elevation of the trap in capturing position;

Figure 5 is a perspective view of a trap base, but showing a modified rear trigger catch; and Figure 6 is a vertical sectional view showing slight modifications in the jaw of the trap complementary to the modified form of base.

In the drawing, the base 10 is provided with a marginal flange 11 having a forwardly projecting trigger catch 12 at the rear end of the trap. A pivot pin 13 extends transversely of the trap and is carried by the flange 11. Mounted centrally on the pin 13 is a bait lever indicated generally by the numeral 14. The lever is preferably provided with a pair of depending ears 15 through which the pin 13 extends. The forward portion of the lever 14 is provided with a bait holder 16, while the rear end 17 acts as a counter-weight tending normally to hold the lever in the position shown in Figure 2.

The lever is also provided with a trigger catch 18 located forwardly of the pin 13 and which may be struck up from the metal of which the bait lever is formed.

The jaw of the trap is indicated generally by the numeral 19 and comprises a forward capturing portion 20 provided with teeth 21 which, when in sprung position will seat within the flange 11 of the forward portion of the trap as shown in Figure 3.

The jaw 19 is provided with a pair of depending ears 22 having slots 23 therein which open rearwardly. These slots accommodate the pin 13 upon which the jaw is pivoted. The rear portion of the jaw 19 is provided with two downwardly struck ears 24 having forwardly opening slots 25 in the form of the invention shown in Figures 1 to 4 inclusive.

A spring 26, preferably comprising a pair of coils as shown in Figure 1, is mounted on the pin 13. The two coils 27 may be united by an integral loop 28 which bears upon the base of the trap while two rearwardly extending arms 29 and 30 bear against the lower surface of the rear portion of the jaw and tend to force the jaw to sprung position.

The arm 30 of the spring is provided with a laterally extended portion 31 which extends through the slots 25 of the ears 24 and forms a pivot or fulcrum for the trigger 32. The trigger has a short arm 33 extending rearwardly of its pivotal point and a relatively long forwardly extending arm 34. The extremities of the arms 33 and 34 are formed for engagement with the catches 12 and 18 respectively as shown in Figure 2.

When the bait lever 14 as viewed in Figure 2 is depressed, the catch 18 will release the arm 34 which will then spring upwardly as the jaw begins its movement toward capturing position. This movement of the trigger releases the arm 33 from the catch 12, leaving the jaw free to move to capturing position under the action of the spring 26.

A slot 35 may be provided in the jaw to permit sufficient counter-clockwise movement of the trigger 32 to fully release the arm 33 from the catch 12. It will be appreciated, of course, that in a less compact structure sufficient space between the trigger and the jaw may be provided for such movement of the trigger without providing the slot 35.

In setting the trap the rear portion of the jaw is pressed downwardly causing the curved portion 36 of the trigger 32 to engage the catch 12. A slight cam action is imparted to the trigger 32 and causes it to move slightly forwardly to permit the point of the arm 33 to pass the catch 12. The ears 24, as above mentioned, being provided with the forwardly opening slots 25, accommodate this movement of the trigger 32 and the extension 31 of the spring arm 30. The arm 34 causes the trigger to move to the left as viewed in Figure 2 when the arm 33 has cleared the catch to thereby engage said catch as the jaw is released by the person setting the trap. The engagement of the arm 33 and the catch 12 causes the trigger 32 to move slightly in counter-clockwise direction whereupon the forward end of the arm 34 engages catch 18 and holds the jaw in set position against the action of the spring.

As mentioned, the rear end of the bait lever is suitably counter-weighted tending to hold the same in the position shown in Figure 2. The relatively long arm 34 results in its exerting but little pressure on the catch 18, whereby but little effort is required to depress the bait lever and thus provides a very sensitive tripping mechanism.

In assembling the jaw on the base after the trigger and spring have been positioned on the pin 13, it is only necessary to hook the ears 22 on the pin 13 and slip the extension 31 of the spring through the slots 25 and the opening in the interposed trigger. The slight rearward tension exerted by the spring 31 holds the jaw against displacement from the pin and permits the trigger 34 to move forward slightly to clear the catch 32 in setting the trap as above described.

No special tools are therefore required in assembling the parts of the trap, all of which, with the exception of the spring, may be stamped from sheet metal.

In Figures 5 and 6 the modifications above referred to consist in providing slits 37 downwardly of the catch 12 to render the same more resilient whereby instead of the trigger 32 being caused to move forwardly during the setting of the trap the catch 12 will move rearwardly slightly to permit the arm 33 to pass the same.

In the modified form as shown in Figure 6, the ears 24 are provided with circular openings only for receiving the spring instead of the slots 25 as shown in Figure 2. The ears 22 of the jaw are provided with forwardly opening slots 38 for receiving the pin 13. In assembling the jaw of this form on the base, the ears 22 are hooked over the pin 13 and the lateral extension of the spring inserted through the circular openings of the ears 24 and the corresponding openings in the trigger 32. In pressing the trap to set position, the curved portion 36 presses the catch 12 rearwardly slightly to permit the point of the arm to pass beneath the catch and engage the lower surface thereof, thereby causing the arm 34 to move into engagement with the catch 18 upon releasing the jaw as described above.

The base 10 is preferably provided with a pair of perforated struck up ears 39 through which the pin 13 passes and which serve to restrain the bait lever against lateral movement or permitting the spring to shift from the position shown in Figure 1.

The jaw 20 is also provided with an opening 40 therein through which bait can be attached to the member 16 while the trap is in sprung position, to avoid injuring the user's fingers.

Opening 40 also will permit the bait lever to tilt counter-clockwise slightly as shown in Figure 3, to avoid the application of deforming stresses to the same by the arm 34 as the trap is being moved initially toward set position.

While I have shown and described certain embodiments of my improvements for the purpose of illustration, I do not wish to be restricted specifically thereto except as so limited by the appended claims.

I claim:

1. An animal trap comprising a base, a jaw pivotally attached intermediate its ends to said base, a spring contacting with the rear portion of said jaw for forcing the forward portion thereof toward said base, a stationary catch on said base, a trigger pivotally carried by the rear portion of said jaw for engaging said catch and having a forwardly extending arm, and a bait lever having a trigger catch for engaging said arm and cooperating with said first mentioned catch for holding said jaw in set position.

2. An animal trap comprising a base having a stationary trigger catch adjacent the rear thereof, a jaw pivotally attached intermediate its ends to said base, a spring contacting with the rear portion of said jaw for forcing the forward portion thereof toward said base, a bait lever pivotally carried by said base and having a trigger catch thereon, and a trigger pivotally carried by the rear portion of said jaw and having a rearwardly extending arm for engaging said first mentioned catch and a relatively long forwardly catch engaging arm for engaging said second mentioned catch for holding said jaw in set position.

3. An animal trap comprising a base having a stationary trigger catch, a jaw pivotally secured to said base, a spring for forcing said jaw into capturing position, a bait lever interposed between said base and jaw and provided with a trigger catch, and a trigger pivotally carried by said jaw having means for engaging both said catches for retaining said jaw in set position.

4. An animal trap comprising a base having a stationary trigger catch at the rear thereof, a pivot pin extending transversely of said base intermediate the ends thereof, a jaw mounted on said pin, a spring carried by said pin for forcing the jaw to capturing position, a bait lever pivoted on said pin and provided with a trigger catch, and a trigger pivotally secured intermediate its ends to said jaw, said trigger having its forward and rear ends shaped for engagement with said catches for holding said jaw in capturing position.

5. An animal trap comprising a base having a pivot pin extending transversely thereof intermediate its ends, a jaw mounted on said pin, a spring on said pin having a rearwardly extending arm for forcing said jaw to capturing position, a bait lever pivotally positioned on said pin and having a trigger catch thereon, a second trigger catch stationarily positioned at the rear end of said base, and a trigger pivotally secured to the rear portion of said jaw in alignment with said catches for engaging the same when said jaw is moved to set position.

6. An animal trap comprising a base provided with a transverse pivot pin intermediate the ends thereof, a stationary trigger catch at the rear end of said base, a jaw secured intermediate its ends to said pin, a spring on said pin for forcing said jaw to capturing position, a bait lever on said pin having a forwardly extending bait holding member and a rearwardly extending counter-balancing portion for elevating said bait holding member above said base and contacting with said base for limiting the upward movement of said member, said lever having a trigger catch located forwardly of said pin, and a trigger pivotally secured intermediate the ends thereof to the rear portion of said jaw and having said ends formed for engagement with said catches for releasably holding the jaw in set position.

7. An animal trap comprising a base having upturned side flanges, a pivot pin carried by said flanges and extending transversely of said base intermediate the ends thereof, a spring on said pin having an arm contacting with said base and another arm contacting with the lower side of said jaw for moving the same to capturing position, a bait lever pivotally mounted on said pin, a trigger having a forwardly extending portion adapted to be engaged by said bait lever and a rear catch engaging portion, a catch for engaging the same for holding said jaw in set position, and a lateral extension on one arm of said spring engaging said trigger for urging the same into position for engagement by said catch.

8. An animal trap comprising a base having a stationary trigger catch, a jaw pivotally mounted thereon, a spring tending to force said jaw to capturing position, a bait lever pivotally carried by the base and having a trigger catch, and a trigger pivotally attached intermediate its ends to said jaw and providing a pair of arms for retaining said jaw in set position, one of said arms being adapted to engage said first mentioned catch and said second arm being relatively long and adapted to engage said second mentioned catch and exerting relatively slight pressure on the respective catch to provide a sensitive tripping mechanism.

9. An animal trap comprising a base having a stationary trigger catch, a jaw pivotally supported by said base, a spring for forcing said jaw to capturing position, a bait lever pivotally supported by said base and having a trigger catch thereon, a trigger pivotally carried by said jaw and having a rearwardly extending arm adapted to contact with said first catch as said jaw is moved to set position to effect relative movement of said catch with respect to said trigger as the latter is moved into engaging position with respect thereto, and a forwardly extending arm on said trigger for engaging said second mentioned catch for retaining said jaw in set position.

10. An animal trap comprising a base having a stationary trigger catch, a jaw pivotally supported by said base, a spring for forcing said jaw to capturing position, a bait lever pivotally supported by said base, means for holding said lever normally in set position, said jaw having a pair of downwardly extended slotted ears, said spring having a lateral extension disposed in said slots, a trigger pivotally mounted on said spring extension between said ears and having a rearwardly extending arm adapted to be moved by said extension into engagement with said first mentioned catch as said jaw is moved to set position, said trigger having a forwardly extending arm, and a catch on said lever for engaging said arm and retaining said jaw in set position.

11. An animal trap comprising a base having a resilient catch at the rear thereof, a jaw pivotally carried by said base, a spring for forcing said jaw to capturing position, a trigger pivotally supported by said jaw and having a rearwardly extending arm adapted to snap past said catch and be engaged by the same as said jaw is being moved to set position, a bait lever pivotally supported by said base, means for moving said lever normally to set position, said lever having a trigger catch, and a relatively long forwardly extending arm on said trigger for engagement by said last mentioned catch for retaining said jaw in set position and exerting only slight pressure on said catch to provide a sensitive tripping mechanism.

12. An animal trap comprising a base having a catch adjacent the rear end thereof, a jaw pivotally attached intermediate the ends thereof to said base and comprising a forward capturing portion and a trigger-carrying rear extension, a spring for forcing said jaw to capturing position, a depending spring-resisted trigger pivotally attached adjacent one end thereof to and positioned beneath and carried by said rear extension, said trigger being arranged to engage said catch when said jaw is pressed to set position, and a bait pan pivotally mounted on said base and having a portion arranged to engage the end of said trigger remote from the pivotal axis thereof for holding the forward end of the pan in elevated position and effecting the release of said trigger from engagement with said catch when the forward end of said pan is depressed to enable said spring to force the jaw to capturing position.

13. An animal trap comprising two major elements pivotally connected together, a spring tending to move one of said elements relatively to the other to animal catching position, a latch on one element, means on the other element adapted to be engaged by said latch to hold the trap set, and a bait lever on said other element adapted operatively to cooperate with said latch.

14. An animal trap comprising a base, a jaw pivotally mounted thereon, a spring tending to move said jaw to snapped position, said jaw and base having rearward extensions serving as handles, a latch member pivotally mounted on the upper handle, means on the lower handle adapted to engage said latch member to set the trap when the handles are caused to approach, and a bait member adapted operatively to engage the latch when the latch moves to trap-setting position.

15. An animal trap comprising two major elements pivotally connected together, a spring tending to move one of said elements to animal-catching position, a latch on one element adapted to cooperate with the other element to hold the trap set, and a bait lever mounted on last said element and having an operative engagement with said latching member only when the trap is in set condition.

16. An animal trap comprising two major elements pivotally connected together, a spring tending to move one of said elements relatively to the other to animal-catching position, a latch pivotally mounted on one element biased towards latching position, means on the other element adapted to be engaged by said latch to hold the trap set, and a bait lever pivotally mounted on one of said elements and having a contact portion displaced vertically from the lever pivot, said contact portion being in engagement with the latch when the trap is in set position and out of engagement with the latch when the trap is in catching position.

17. An animal trap comprising a base, a jaw pivotally mounted on said base at an intermediate position thereof, a handle rigid with said jaw overhanging the rear portion of said base, latching means on said base, a latch depending from said handle adapted to engage the means on said base to hold the trap set, and a bait lever pivotally mounted on said base and having an operative engagement with said latch when the trap is set.

18. An animal trap comprising a base, a jaw pivotally mounted on said base at an intermediate position thereof, a handle rigid with said jaw overhanging the rear portion of said base, resilient means biasing said jaw towards animal-catching position, a latch depending from said handle, means on said base for engaging said latch, over which said latch slips when the handle is moved towards the base, said latch being biased towards latching position, and a bait lever pivotally mounted on said base and having an operative engagement with the latch when the trap is set.

WALTER LESLIE ORR.